April 24, 1956      H. SEQUIN      2,743,041
CONDIMENT DISPENSER
Filed March 15, 1954
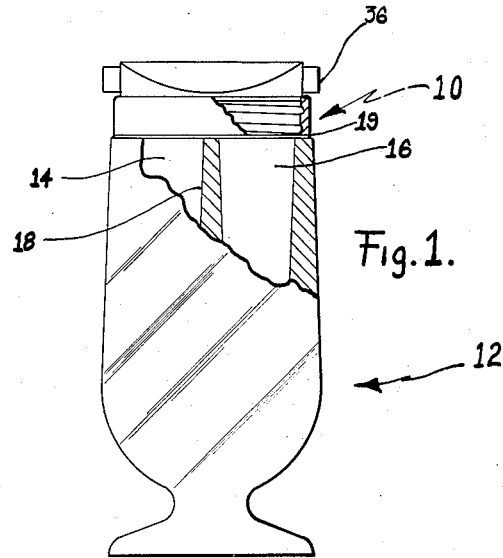
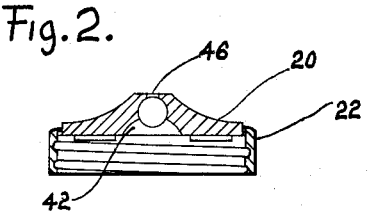
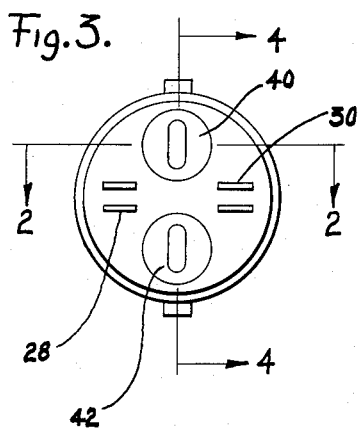
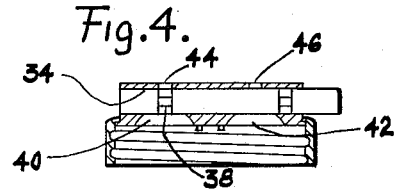
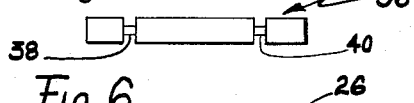
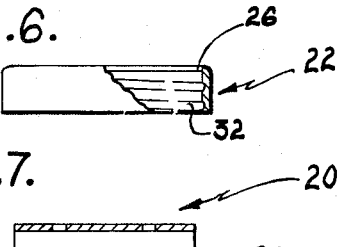
INVENTOR.
HECTOR SEQUIN
BY SMITH, OLSEN
& KOTTS

United States Patent Office 2,743,041
Patented Apr. 24, 1956

2,743,041

CONDIMENT DISPENSER

Hector Sequin, Dearborn, Mich.

Application March 15, 1954, Serial No. 416,248

4 Claims. (Cl. 222—142.8)

The present invention relates to improvements in a condiment dispenser and more particularly to a unitary condiment dispenser adapted to selectively dispense a plurality of condiments such as salt and pepper.

Prior to the present invention, many attempts have been made to provide a commercially practical unitary dispenser which would dispense both salt and pepper. These attempts have resulted in complex devices which cannot be manufactured at a suitable cost. In fact, many of such proposed devices cannot be manufactured at all by the usual well known high volume production techniques.

Such prior devices known to applicant that have been made were unsatisfactory because of the tendency of the salt to mix with the pepper, and the tendency of the salt to absorb moisture. These undesirable conditions were due at least in part to unsuitable dispensing valve structures.

Therefore, it is a principal object of the present invention to provide a unitary condiment dispenser which may be readily operated to selectively dispense one of a plurality of condiments.

It is another object of the present invention to provide such a dispenser which is attractive, and which may be easily and quickly produced by conventional high volume production methods.

It is another object of the present invention to provide such a dispenser which is moisture-proof, and which maintains effective separation of the contents therein.

It is a further object of the present invention to provide such a dispenser which is simple in construction, efficient in operation, and which may be produced at relatively low cost.

Other objects of this invention will appear in the following description and appended claims, reference being had to the accompanying drawings forming a part of this specification wherein like reference characters designate corresponding parts in the several views.

In the drawings:

Fig. 1 is a side elevation of a condiment dispenser embodying the present invention, a portion being broken away to more fully disclose the internal construction.

Fig. 2 is a sectional view of the cover taken along the line 2—2 in the direction of the arrows, Fig. 3.

Fig. 3 is a bottom view of the cover.

Fig. 4 is a sectional view of the cover taken along the line 4—4 in the direction of the arrows, Fig. 3.

Fig. 5 is a side view of the valve rod.

Fig. 6 is a side view of the retaining ring portion of the cover, a portion being broken away for clarity.

Fig. 7 is a side view of the cap portion of the cover.

Before explaining the present invention in detail, it is to be understood that the invention is not limited in its application to the details of construction and arrangement of parts illustrated in the accompanying drawings, since the invention is capable of other embodiments and of being practiced, or carried out in various ways. Also, it is to be understood that the phraseology or terminology employed herein is for the purpose of description and not of limitation.

A condiment dispenser embodying a preferred form of the present invention is shown in the drawings wherein 10 generally indicates the cover and 12 generally indicates the body portion. The body portion 12 is substantially cylindrical and is formed of a transparent material such as glass or a suitable plastic. The hollow interior of the body portion is divided into two chambers 14 and 16 by the partition 18. The top of the body portion 12 is open and is provided with screw threads 19 for maintaining the cover 10 in position. The chambers 14 and 16 taper slightly inwardly from the top to the bottom. This permits withdrawal of the mold cores from the chambers after the body portion 10 of the device has been formed.

The cover and valve construction is shown in detail in Figs. 2–7 of the drawings. The cover comprises a cap 20, and a retaining ring 22 which is adapted to fit over the cap 20. The cap 20 has a flange 24 thereon which seats the shoulder 26 of the retaining ring 22 in the assembled position.

The bottom of the cap 20 is flat and seats in close engagement on the top of the body portion 12 when in the assembled position. A pair of spaced guide lugs 28 and a pair of spaced guide lugs 30 are provided on the bottom of the cap 20. These guide lugs are placed over the top edge of the partition 18 of the body portion when the device is assembled. The screw threads 32 on the retaining ring 22 are then engaged with the screw threads 19 at the top of the body portion 10, and the retaining ring is screwed down until the shoulder 26 on the retaining ring is in firm engagement with the flange 24 on the cap 20. In this manner, the cap 20 is always correctly positioned with respect to the chambers 14 and 16, and the threads on the retaining ring 22 and body portion 12 do not have to be precisely figured in order to assure correct positioning of the cover 10.

The cap 20 is provided with a transverse bore 34 which is adapted to seat the valve rod 36. The valve rod 36 is round and is provided with a pair of by-pass sections of reduced diameter at 38 and 40. The valve rod is preferably made of a non-brittle material such as nylon. When such material is used, the by-pass sections can be of relatively small diameter without the danger of breaking. Further, the nylon material is readily ground to the desired dimension to provide a close fit in the transverse bore 34 while still permitting easy sliding movement of the valve rod as desired.

The cap 20 is provided with a pair of rounded passages 40 and 42 which communicate with the transverse bore 34. The radius of each rounded passage is such that it extends well into the transverse bore 34. In this manner, the contents of the device may be efficiently guided to the transverse bore 34 from the chambers 14 and 16 without the necessity of a narrow passage opening.

A pair of spaced outlet ports 44 and 46 are provided in the top of the cap 20. These outlet ports are aligned with the rounded passages 40 and 42. The distance between the by-pass sections 38 and 40 is greater than the distance between the outlet ports 44 and 46 so that in the centered position of the valve rod 36 as shown in Fig. 1 both outlet ports are closed. As the valve rod is pushed in one direction or the other, one of the passages is aligned with one of the by-pass sections on the valve rod. For example, in Fig. 4 the valve rod has been moved to the right of the centered position and the by-pass section 38 is aligned with outlet port 44 and rounded passage 40. In this position of the valve with the dispenser shown in Fig. 1, the contents of chamber 14 would pass out the passage 40, around the by-pass section 38, and out the outlet port 44.

The dispenser of the present invention is easily assembled by pulling the valve rod 36 out of the transverse bore 34 of the cap 20, unscrewing the retaining ring 22, and removing the cap 20. All of the parts are formed so that they can be easily washed and dried.

The device is simple and easy to manipulate. It can be readily manufactured in large volume by conventional procedures, and is efficient in operation.

Having thus described my invention, I claim:

1. A condiment dispenser, comprising a hollow body portion having an open top, a partition therein which forms a pair of separate chambers, a cap seated on the upper rim of said body portion and having a transverse bore therethrough and a pair of outlet ports in the top thereof, a pair of passages in said cap one disposed over each chamber and intersecting the transverse bore in alignment with one of said outlet ports, a cylindrical valve rod slidably disposed in said transverse bore in said cap and having a pair of by-pass sections of reduced diameter intermediate its ends which may be selectively positioned in registry with either of the aligned passages and ports upon sliding movement of the valve rod, the distance between said reduced portions on said valve rod being greater than the distance between said passages so that one passage will remain closed when the other is opened and both passages will be closed at the centered position of the valve rod, said rod having both of its ends extending beyond the limits of the cap in its centered position whereby to form manually engageable portions for actuation of the rod, a flange formed on the edge of said cap, a retaining ring having a shoulder thereon which shoulder is disposed over the flange on said cap, said retaining ring having means thereon for detachably affixing it to the top of said body portion, and guide means extending downwardly from said cap and engaging the top edge of said partition to position the cap while the retaining ring is being affixed in place.

2. A condiment dispenser, comprising a hollow body portion having an open top, a partition therein which forms a pair of separate chambers, a cap seated on the upper rim of said body portion and having a transverse bore therethrough and a pair of outlet ports in the top thereof, a pair of passages in said cap one disposed over each chamber and intersecting the transverse bore in alignment with one of said outlet ports, a cylindrical valve rod slidably disposed in said transverse bore in said cap and having a pair of by-pass sections of reduced diameter intermediate its ends which may be selectively positioned in registry with either of the aligned passages and ports upon sliding movement of the valve rod, the distance between said reduced portions on said valve rod being greater than the distance between said passages so that one passage will remain closed when the other is opened and both passages will be closed at the centered position of the valve rod, said rod having both of its ends extending beyond the limits of the cap in its centered position whereby to form manually engageable portions for actuation of the rod.

3. A condiment dispenser, comprising a hollow body portion having an open top, a partition therein which forms a pair of separate chambers, a cap seated on the upper rim of said body portion and having a transverse bore therethrough and a pair of outlet ports in the top thereof, a pair of passages in said cap one disposed over each chamber and intersecting the transverse bore in alignment with one of said outlet ports, a cylindrical valve rod of flexible material disposed in said transverse bore in said cap and having a pair of by-pass sections of reduced diameter intermediate its ends which may be selectively positioned in registry with either of the aligned passages and ports upon sliding movement of the valve rod, the flexible nature of the valve rod material permitting the reduced diameter sections to be made thinner than would otherwise be possible, the distance between said reduced sections on said valve rod being greater than the distance between said passages so that one passage will remain closed when the other is opened and both passages will be closed at the centered position of the valve rod.

4. A condiment dispenser, comprising a hollow body portion having an open top, a partition therein which forms a pair of separate chambers, a cap seated on the upper rim of said body portion and having a transverse bore therethrough and a pair of outlet ports in the top thereof, a pair of spherical passages in said cap one disposed over each chamber and intersecting the transverse bore in alignment with one of said outlet ports, the radius of each of said spherical passages extending well into said transverse bore, a cylindrical valve rod disposed in said transverse bore in said cap and having a pair of by-pass sections of reduced diameter intermediate its ends which may be selectively positioned in registry with either of the aligned passages and ports upon sliding movement of the valve rod, the distance between said reduced sections on said valve rod being greater than the distance between said passages so that one passage will remain closed when the other is opened and both passages will be closed at the centered position of the valve rod.

References Cited in the file of this patent

UNITED STATES PATENTS

| | | |
|---|---|---|
| 898,150 | Stapleton | Sept. 8, 1908 |
| 968,257 | Olson | Aug. 23, 1910 |
| 1,005,668 | Stuart | Oct. 10, 1911 |
| 1,516,942 | Wise | Nov. 25, 1924 |
| 1,948,227 | Rechten | Feb. 20, 1934 |